United States Patent
Robinton et al.

(10) Patent No.: US 9,681,302 B2
(45) Date of Patent: Jun. 13, 2017

(54) METHOD, APPARATUS, AND SYSTEM FOR PROVIDING AND USING A TRUSTED TAG

(71) Applicant: ASSA ABLOY AB, Stockholm (SE)

(72) Inventors: Mark Robinton, Eden Prairie, MN (US); Tam Hulusi, Santa Ana, CA (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/426,180

(22) PCT Filed: Sep. 5, 2013

(86) PCT No.: PCT/IB2013/002617
§ 371 (c)(1),
(2) Date: Mar. 5, 2015

(87) PCT Pub. No.: WO2014/037812
PCT Pub. Date: Mar. 13, 2014

(65) Prior Publication Data
US 2015/0208245 A1  Jul. 23, 2015

Related U.S. Application Data

(60) Provisional application No. 61/698,731, filed on Sep. 10, 2012.

(51) Int. Cl.
*H04W 12/10* (2009.01)
*H04B 5/00* (2006.01)
(Continued)

(52) U.S. Cl.
CPC .......... *H04W 12/10* (2013.01); *H04B 5/0031* (2013.01); *H04L 9/3247* (2013.01);
(Continued)

(58) Field of Classification Search
CPC ... H04W 5/0031; H04W 12/06; H04W 12/10; H04W 4/008; H04L 2209/805; H04L 63/126; H04L 9/3247
(Continued)

(56) References Cited

U.S. PATENT DOCUMENTS 7,295,114 B1  11/2007  Drzaic et al.
7,942,312 B2  5/2011  van Ingen
(Continued)

FOREIGN PATENT DOCUMENTS

CN  102663591  9/2012
EP  1710764  10/2006
(Continued)

OTHER PUBLICATIONS

U.S. Appl. No. 14/772,011, filed Sep. 1, 2015, Hoyer et al.
(Continued)

*Primary Examiner* — Nathan Taylor
(74) *Attorney, Agent, or Firm* — Sheridan Ross P.C.

(57) ABSTRACT

A trusted authority, validation system and method are provided. The system and method may employ Near Field Communication (NFC) technologies to prepare and write signed validation signatures to tags as well as read and analyze validation signatures from tags. An NFC-enabled phone is also provided as a mechanism for facilitating the trusted authority and validation services described herein.

19 Claims, 7 Drawing Sheets

(51) Int. Cl.
H04L 9/32 (2006.01)
H04L 29/06 (2006.01)
H04W 12/06 (2009.01)
H04W 4/00 (2009.01)

(52) U.S. Cl.
CPC .......... *H04L 63/126* (2013.01); *H04W 4/008* (2013.01); *H04W 12/06* (2013.01); *H04L 2209/805* (2013.01)

(58) Field of Classification Search
USPC ....................................................... 455/411
See application file for complete search history.

(56) References Cited

U.S. PATENT DOCUMENTS

| | | | |
|---|---|---|---|
| 8,074,271 | B2 | 12/2011 | Davis et al. |
| 8,285,211 | B2 | 10/2012 | Wang et al. |
| 8,344,853 | B1 | 1/2013 | Warner et al. |
| 2005/0061875 | A1* | 3/2005 | Zai .................. G06K 7/0008 235/383 |
| 2006/0230276 | A1* | 10/2006 | Nochta .................. G07F 7/08 713/176 |
| 2006/0277061 | A1 | 12/2006 | Revanur et al. |
| 2008/0069347 | A1* | 3/2008 | Brown .................. H04L 9/3066 380/45 |
| 2008/0122584 | A1 | 5/2008 | Itasaki et al. |
| 2010/0007466 | A1* | 1/2010 | Shoarinejad ......... G06Q 20/409 340/10.1 |
| 2010/0079237 | A1 | 4/2010 | Falkk et al. |
| 2010/0299527 | A1* | 11/2010 | Arunan ................ H04L 9/3247 713/176 |
| 2011/0025458 | A1* | 2/2011 | Rokhsaz ............. H04L 63/0853 340/5.8 |
| 2011/0074552 | A1 | 3/2011 | Norair et al. |
| 2012/0013448 | A1* | 1/2012 | Baranowski .......... H04L 9/3271 340/10.52 |
| 2012/0159105 | A1 | 6/2012 | Von Behren et al. |
| 2012/0207305 | A1 | 8/2012 | Gallo et al. |
| 2012/0265988 | A1 | 10/2012 | Ehrensvard |
| 2013/0061303 | A1 | 3/2013 | Hart et al. |
| 2013/0166917 | A1* | 6/2013 | Granbery .............. H04L 9/3247 713/179 |
| 2013/0344808 | A1 | 12/2013 | Murray et al. |
| 2014/0023195 | A1 | 1/2014 | Lee et al. |
| 2014/0173708 | A1 | 6/2014 | Garlick |
| 2014/0357187 | A1* | 12/2014 | Ehrensvard ......... H04L 63/0838 455/41.1 |
| 2016/0012696 | A1 | 1/2016 | Robinton et al. |
| 2016/0021091 | A1 | 1/2016 | Hoyer et al. |
| 2016/0021100 | A1 | 1/2016 | Hoyer |

FOREIGN PATENT DOCUMENTS

| | | |
|---|---|---|
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |
| WO | WO 2014/140807 | 9/2014 |
| WO | WO 2014/140814 | 9/2014 |
| WO | WO 2014/140818 | 9/2014 |
| WO | WO 2014/177934 | 11/2014 |
| WO | WO 2015/001376 | 1/2015 |

OTHER PUBLICATIONS

U.S. Appl. No. 14/897,708, filed Dec. 11, 2015, Hoyer et al.
"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].
International Preliminary Report on Patentability for International (PCT) Patent Application No. PCT/IB2013/001949, mailed Jan. 14, 2016 10 pages.
International Preliminary Report on Patentability for International (PCT) Patent Application No. PCT/IB2014/001558, mailed Sep. 24, 2015 7 pages.
International Preliminary Report on Patentability for International (PCT) Patent Application No. PCT/IB2014/000853, mailed Sep. 24, 2015 10 pages.
International Preliminary Report on Patentability for International (PCT) Patent Application No. PCT/IB2014/000812, mailed Sep. 24, 2015 8 pages.
International Preliminary Reprot on Patentability for International (PCT) Patent Application No. PCT/IB2014/000843, mailed Sep. 24, 2014 8 pages.
U.S. Appl. No. 14/897,708, filed Dec. 11, 2015.
U.S. Appl. No. 14/772,894, filed Sep. 4, 2015.
U.S. Appl. No. 14/772,921, filed Sep. 4, 2015.
U.S. Appl. No. 14/772,011, filed Sep. 1, 2015.
U.S. Appl. No. 14/772,995, filed Sep. 4, 2015.
U.S. Appl. No. 14/306,078, filed Jun. 16, 2014.
U.S. Appl. No. 14/306,078, filed Jun. 16, 2014, Hoyer et al.
"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].
"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].
"NFC Signature Record Type Definition (RTD) Technical Specification," NFC Forum, Nov. 18, 2010, 18 pages [retrieved from: http://members.nfc-forum.org/specs/spec_license].
Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].
Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].
Kilas et al. "Digital Signatures on NFC Tags Master of Science Thesis," Mar. 18, 2009, 53 pages [retrieved from: http://web.it.kth.se/~johanmon/theses/kilas.pdf].
Leicher et al. "Smart OpenID: A Smart Card Based OpenID Protocol," IFIP Advances in Information and Communication Technology, 2012, vol. 376, pp. 75-86.
Pearson "Securing the Pharmaceutical Supply Chain with RFID and Public-key infrastructure (PKI) Technologies," Texas Instruments, Jun. 2005, White Paper, 12 pages.
Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.
Saeed et al. "Off-line NFC Tag Authenticiation," The 7th International Conference for Internet Technology and Secured Transactions, 2012 International Conference for IEEE, Dec. 10, 2012, pp. 730-735.
Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.
Tan et al. "A Robust and Secure RFID-Based Pedigree System (Short Paper)," Information and Communications Security Lecture Notes in Computer Science, Jan. 2006, pp. 21-29.
Vassilev et al. "Personal Brokerage of Web Service Access," Security & Privacy, Sep. 2007, vol. 5, No. 5, pp. 24-31.
International Search Report and Written Opinion for International (PCT) Patent Application No. PCT/IB2013/002617, mailed Feb. 19, 2014 12 pages.

(56) References Cited

OTHER PUBLICATIONS

International Preliminary Report on Patentability for International (PCT) Patent Application No. PCT/IB2013/002617, mailed Mar. 19, 2015 8 pages.
International Search Report and Written Opinion for International (PCT) Patent Application No. PCT/IB2013/001949, mailed Feb. 25, 2014 15 pages.
International Search Report and Written Opinion for International (PCT) Patent Application No. PCT/IB2014/001558, mailed Nov. 12, 2014 11 pages.
International Search Report and Written Opinion for International (PCT) Patent Application No. PCT/IB2014/000853, mailed Sep. 17, 2014 15 pages.
International Search Report and Written Opinion for International (PCT) Patent Application No. PCT/IB2014/000812, mailed Sep. 18, 2014 13 pages.
International Search Report and Written Opinion for International (PCT) Patent Application No. PCT/IB2014/000843, mailed Sep. 12, 2014 13 pages.
International Search Report and Written Opinion for International (PCT) Patent Application No. PCT/IB2014/002157, mailed Feb. 17, 2015 12 pages.
International Search Report and Written Opinion for International (PCT) Patent Application No. PCT/IB2014/002986, mailed Jun. 30, 2015 19 pages.
Official Action for U.S. Appl. No. 14/306,078, mailed Jul. 2, 2015 11 pages.

* cited by examiner

METHOD, APPARATUS, AND SYSTEM FOR PROVIDING AND USING A TRUSTED TAG

CROSS REFERENCE TO RELATED APPLICATION

This application is a national stage application under 35 U.S.C. 371 of PCT Application No. PCT/IB2013/002617 having an international filing date of Sep. 5, 2013, which designated the United States, which PCT application claimed the benefit of U.S. Application Ser. No. 61/698,731, filed Sep. 10, 2012, both of which are incorporated by reference in their entirety.

FIELD OF THE DISCLOSURE

The present disclosure is generally directed toward creating and managing trusted data.

BACKGROUND

One type of identification technology employs Near Field Communications (NFC). NFC is a set of short-range wireless communication technologies that have devices operate at approximately 13.56 MHz and at rates ranging from 106 kbit/s to 848 kbit/s. NFC standards cover communications protocols and data exchange formats, and are based on existing radio-frequency identification (RFID) standards including ISO/IEC 14443 and FeliCa, each of which are hereby incorporated herein by reference in their entirety. The standards include ISO/IEC 18092, which is also incorporated herein by reference in its entirety, and those defined by the NFC Forum.

Another type of technology currently gaining traction and emerging as a viable alternative to NFC is newer versions of the Bluetooth standard (e.g., Bluetooth 4), the entire contents of which are hereby incorporated herein by reference. Bluetooth is a proprietary open wireless technology standard for exchanging data over short distances (using short-wavelength radio transmissions in the ISM band from 2400-2480 MHz) from fixed and mobile devices, creating personal area networks (PANs) with high levels of security. The primary difference between NFC technologies and Bluetooth technologies is that Bluetooth relies on powered devices for both sides of the communication whereas NFC facilitates communications between a powered device and a passive device (e.g., an NFC tag or credential). In other words, under NFC standards, one device can operate without an internal power source, such as a battery.

There are currently three NFC operating modes defined by the NFC Forum: (1) Card Emulation Mode; (2) Reader/Writer Mode; and (3) Peer-to-Peer Mode. In the Card Emulation Mode, an NFC-enabled phone emulates a contactless card in accordance with ISO 14443 and/or ISO 15693, each of which are hereby incorporated herein by reference in their entirety. Typical applications of the Card Emulation Mode include payment, ticketing, and access control applications.

In the Reader/Writer Mode, the NFC-enabled phone reads a tag and typically performs some function based on the information obtained from the read tag. Typical applications of the Reader/Writer Mode include reading posters with an NFC tag in proximity thereto, interactive advertising, launching mobile Internet (e.g., automated web-browser activation), automated Short Message Service (SMS), and automated call initiation.

In the Peer-to-Peer Mode, two NFC-enabled phones, or similar types of devices, are allowed to exchange data with one another. Typical applications of the Peer-to-Peer Mode include setting up wireless settings (e.g., Bluetooth, Wi-Fi, etc.), sharing business cards, or sharing information between NFC-enabled phones.

In most transactions, NFC involves an initiator and a target. The initiator actively generates a Radio Frequency (RF) field that can power a passive target. The NFC protocol enables communications between readers and relatively simple devices such as tags, key fobs, cards, etc., which do not necessarily require batteries.

As with proximity card technologies, NFC is mediated by magnetic induction between two loop antennas located within one another's near field, effectively forming an air-core transformer.

The applications for NFC technology are numerous. In particular, as discussed above, NFC can be implemented in mobile ticketing applications (e.g., extension of secure access system utilizing contactless cards, airline tickets, concert/event tickets, etc.), electronic keys (e.g., as a replacement for car keys, house keys, office keys, hotel room keys, etc.), mobile payment, intelligent advertising, Bluetooth pairing, and so on.

SUMMARY

It is one aspect of the present disclosure to provide the ability to leverage NFC and/or Bluetooth technologies to create and manage trusted relationships and objects. Although embodiments of the present disclosure will be primarily discussed in connection with NFC technologies, it should be appreciated that alternatives to NFC technologies can be used without departing from the scope of the present disclosure. For example, Bluetooth 4, other variants of the Bluetooth standard, and/or other comparable medium-to-short-range communication protocols can be employed to create and manage trusted relationships and objects.

The use cases where such trusted relationships and objects can be leveraged are many. As one non-limiting example, the utilization of NFC tags are proposed to help customers, end users, and the like check if a product they have purchased is genuine. As another non-limiting example, an NFC tag can also be used to help a customer determine if the corresponding warranty for the purchased product is valid. As still other non-limiting examples, NFC tags can be used in chain-of-custody, authenticity verification, secure logging, document validation, electronic signatures (e.g., for creative or copyrighted works), notarization, dual notarization, certified appraisals, etc.

It is one aspect of the present disclosure to provide a system and method for writing data to a tag that can be verified and/or proven to be trusted. In some embodiments, a user is allowed to enter data into an NFC or Bluetooth-enabled phone (referred to herein as an "NFC-enabled phone" or "phone" for convenience and simplicity) that will be written to the tag. Before or after the user enters the data into the phone, the phone reads tag data from the tag (e.g., an NFC tag). The phone then collects the user-entered data, the tag data, and/or some other type of metadata describing the circumstances around the entry of the user data (e.g., a timestamp, current geolocation information for the phone, gesture information, biometric information, a Physical Unclonable Function (PUF), current network status, combinations thereof, etc.) to send to a trusted authority. The trusted authority analyzes the data received from the phone and, based on some or all of the received data, generates a validation signature (e.g., a notary signature) that is transmitted back to the phone. In some embodiments, the validation signature may correspond to some value or combination of values that was computed based on the received user data, tag data, and/or metadata. Moreover, the validation signature may be encrypted with an encryption key. The phone then writes the validation signature (possibly encrypted) onto the tag where it can be stored along with one or more of the tag data (which was already present on the tag), user data, metadata, etc.

It is another aspect of the present disclosure to provide a system and method for reading data from a tag and validating the same. In some embodiments, a tag can be read (e.g., by a phone) and the data provided from the tag can include tag data, user-entered data, metadata, and/or a validation signature (possibly encrypted). The device which read the data from the tag then either (1) analyzes the validation signature, user-entered data, metadata, and/or tag data to validate the tag or the data stored thereon or (2) sends the data on to a separate entity for validation. In the situation where a separate entity validates the validation signature, the separate entity analyzes the received information and either returns an acknowledgement or denial back to the device which read the tag. A visual indication of the verification results can then be displayed via the reading device, other data can be displayed via the reading device, and/or an action can be performed by the reading device. As a non-limiting example, the reading device may correspond to an NFC-enabled phone and if the tag corresponds to a trusted tag (e.g., the validation signature or encrypted validation signature was validated) then the NFC-enabled phone can display the fact that the tag is trusted and may perform some other action automatically such as placing a call to a predetermined number (e.g., customer service for the product that was associated with the trusted tag), sending an SMS message to a predetermined number, sending an email to a predetermined address, launching a web browser and directing it to a predetermined URL, opening an application, combinations thereof, etc.

It is another aspect of the present disclosure to leverage NFC and/or Bluetooth technologies to distribute access credentials. In some embodiments, when an NFC-enabled phone is used for physical access to a building, upon successful validation of that phone to a reader, the phone informs a trusted authority. The trusted authority, upon receiving an indication that the phone has been granted access to the building via one reader, then sends the phone applicable Tag Keys that are within the same premises as the reader that already granted access to the phone.

As can be appreciated, concepts of a trusted tag disclosed herein can be used to provide and manage many types of objects that have traditionally required a physical proof of authenticity (e.g., stamps, stickers, seals, physical signatures, etc.). For instance, secure warranty cards can be distributed that are unclonable and are electronically verifiable at any time in the field either by a merchant or an end user that has an NFC-enabled phone. Moreover, the tags can be securely updated through NFC-enabled phones.

As can be appreciated, embodiments of the present disclosure enable a suite of secure warranty card services such as secure issuance services, secure update services, revocation services by the issuer, and/or reporting services.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
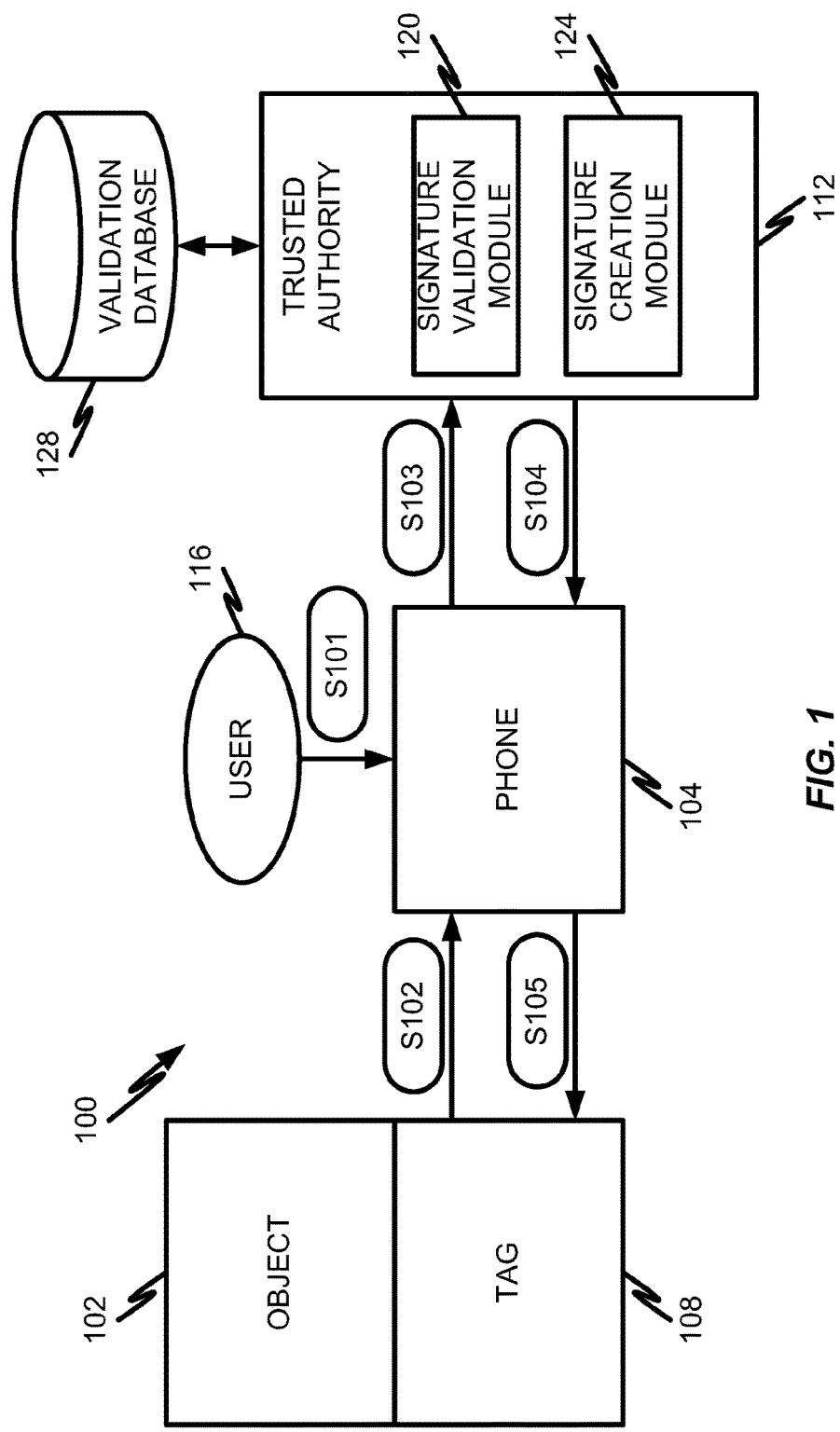
FIG. 1 is a block diagram depicting a communication system and method for writing secure data to a tag in accordance with embodiments of the present disclosure.

Referring initially to FIG. 1, a first communication system 100 and method for distributing validation signatures to tags will be described in accordance with at least some embodiments of the present disclosure. The communication system 100 is depicted as including a phone 104, an NFC tag 108, a trusted authority 112, and a validation database 128. In some embodiments, the phone 104 corresponds to any type of communication device that is NFC-enabled. Examples of suitable devices that can be used as the phone 104 include, without limitation, an NFC-enabled smartphone, an NFC-enabled cellular phone, an NFC-enabled tablet, an NFC-enabled computer, a traditional RFID reader connected to a communication device (e.g., a reader connected to a phone, tablet, or computer via a wired or wireless data connection), or any combination thereof. In some embodiments the phone 104 is configured to read data from the tag 108 in accordance with contact or contactless communication protocols. Of course, the phone 104 may be multiple devices that, when used in combination, are configured to read data from the tag 108. Further still, the instructions that enable the phone 104 to read data from the tag may be embedded into an operating system or firmware of the phone 104 or they may be incorporated into the phone 104 via one or more applications that have been loaded onto the phone 104.

The phone 104 and tag 108 may exchange data via any known or yet-to-be-established contact or contactless communication protocols. As a non-limiting example, the tag 108 may correspond to a Radio Frequency Identification (RFID) device and may be configured to exchange data with the phone 104 in accordance with any well known data-communication protocol (e.g., ISO 14443, ISO 15693, ISO 18092, FeliCa, Near Field Communications (NFC), Bluetooth, Wi-Fi (e.g., 802.11N, variants thereof, or extensions thereto), ZigBee, GSM, combinations thereof, etc.). Alternatively, or in addition, the tag 108 may exchange data with the phone 104 via one or more of optical, magnetic, or acoustic mechanisms. As another non-limiting example, the tag 108 may correspond to a contact-based tag and may either be inserted into a credential acceptor in the phone 104, swiped through a slot in the phone 104, pressed to the phone 104, etc. In general, any type of interface known or yet to be developed that facilitates data communications (secure/encrypted or unsecure/unencrypted) between the tag 108 and phone 104 can be employed. Accordingly, although embodiments of the present disclosure will primarily refer to NFC and related protocols, it should be appreciated that the embodiments described herein are not so limited.

The tag 108 may, in some embodiments, be constructed as a traditional card-shaped RFID credential. The tag 108 may, however, assume form factors other than a traditional card-shaped RFID credential. Examples of form factors suitable for the tag 108 include, without limitation, an Integrated Circuit (IC) card with or without an antenna, a smart card, a key fob, a passport, a credit card, a debit cart, a sticker, paper and a printed tag (e.g., IC chip connected to a printed antenna), a wristband, a shoe insert, a button, and the like.

The tag 108 may be associated with an object 102 that is desired to have a trusted relationship established for it. Suitable mechanisms for associating a tag 108 with an object 102 or multiple objects 102 include fastening the tag 108 to the object 102, connecting the tag 108 to the object 102 (e.g., permanently, with a tamper evidence mechanism, irremovably, removably, directly, indirectly, etc.), placing the tag 108 in a position near the object 102, embedding the tag 108 within the object 102, incorporating the tag 108 into the object 102, molding the tag 108 around or within the object, 102 casting the tag 108 with the object 102, or combinations thereof. Associating the tag 108 with the object 102 will allow for the verification of authenticity of the object 102 via verification of the tag's 108 authenticity.

A user 116 may be allowed to carry and use the phone 104. As used herein, the terms "holder" and "user" are used interchangeably in reference to an individual carrying or a phone 104 or any other device that is being used to either notarize a tag 108, validate a tag 108, gain entry to a secured premises, etc.

The trusted authority 112 may correspond to a single entity or multiple entities that are capable of signing tags 108 (e.g., providing a trusted signature to the tag 108), validating signatures on tags 108, distributing access credentials, and/or any function described herein as being part of a trusted tag service. In some embodiments, the trusted authority 112 represents one or more servers (e.g., web server(s), managed or managing devices under SNMP, etc.) that are configured to execute various trusted tag services. The trusted authority 112 may communicate with the phone 104 or any other communication device using known communication networks and protocols. As an example, the phone 104 and trusted authority 112 may exchange information over a telephone network, a cellular network, an IMS network, a Wide Area Network (e.g., the Internet), a Local Area Network, an IP network, an SNMP network, or any other known type of network architecture. Messages exchanged between the phone 104 and trusted authority 112 may be formatted in any number of formats. As some non-limiting examples, the phone 104 and trusted authority 112 may exchange information via one or more of email messages, SMS messages, one or more messages transmitted using HTTP or SHTTP or variants thereof, one or more messages transmitted using SNMP or variants thereof, one or more messages exchanged via FTP, one or more messages exchanged via RTP or UDP, etc.

In some embodiments, the trusted authority 112 comprises a signature validation module 120 and a signature creation module 124, each of which may be instructions stored in memory and executed by a processor of the server of the trusted authority 112. The signature creation module 124 may be invoked by the trusted authority 112 to create and provide tag signature services. When a new tag 108 is signed (e.g., has data written thereto and that data is to be validated with a signature or multiple signature), the trusted authority 112 may store information in the validation database 128 that can later be used by the signature validation module 120 to analyze and validate data received from a tag 108 during a tag validation procedure. As can be appreciated, some or all of the validation database 128 may be external to the trusted authority 112 or some or all of it may be incorporated into the trusted authority 112. The data exchanges between the trusted authority 112 and validation database 128 may be performed using a known database exchange language (e.g., Structured Query Language (SQL)). Alternatively, or in addition, the trusted authority 112 and validation database 128 may exchange data using a non-structured language or any other type of known communication protocol, such as those described above in connection with the data exchanges between the phone 104 and trusted authority 112.

The validation database 128 may store validation information (e.g., information regarding signature that have been created, keys that were used to encrypt signatures, data that has been written to tags and validated with a signature, and/or any other information that has been distributed or received by the trusted authority 112) as well as information that describes the tag(s) 108 to which the validation information has been distributed. More specifically, the validation database 128 may comprise information that maps a validation signature to a particular tag 108 (e.g., via UID or some other tag information that is specific to a particular tag 108). The validation database 128 may comprise a hierarchical database, a simple table, a pivot table, a spreadsheet, or any other data storage format that is known in the computing arts.

A method of writing secure data to the tag 108 will now be described in connection with the system 100 depicted in FIG. 1. The method begins when a user 116 enters data that is to be written to the tag 108 (step S101). The user 116 may enter this data via a keypad, touch pad, audibly, as one or more pictures of the object 102, as one or more pictures of the user 116, as one or more pictures of surroundings about the object 102, or combinations thereof. As an example, the user 116 may enter a description of the object 102 and/or tag 108. As another example, the user 116 may take one or more pictures (still or motion) of the object 102 and/or tag 108 and enter this information in step S101. As yet another example, the user 116 may capture audio produced by the object 102 and enter this data in step S101. As yet another example, the user 116 may enter a URL or website that is to be written to the tag. As yet another example, the user may enter a user name, legal name, PIN, password, and/or biometric data as part of a notary service.

A next step, which actually may be performed before or after step S101, involves the phone 104 obtaining tag data from the tag 108 (step S102). In this step, the phone 104 may operate in a Reader/Writer Mode and activate an IC chip contained in the tag 108. Upon being activated, the tag 108 may transmit data stored in the IC chip (e.g., in memory) back to the phone 104. In some embodiments, the phone 104 and tag 108 follow the data exchange protocols defined for NFC communications. In some embodiments, the phone 104 and tag 108 follow data exchange protocols defined for Bluetooth communications. As a non-limiting example, the tag 108 may provide its UID back to the phone 104 in step S102. The UID and any other information stored on the NFC tag 108 (e.g., site code, manufacturer code, tag type, etc.) may be provided back to the phone 104 in one or more messages transmitted according to predefined data-exchange requirements. The data stored in the NFC tag 108 may be stored in accordance with the NFC Data Encoding Format (NDEF) and may be transmitted to the phone 104 via one or more NDEF messages. Although the arrow depicted in connection with step S102 is shown to be unidirectional from the tag 108 to the phone 104, it should be appreciated that data exchanges between the phone 104 and tag 108 in this step may be bidirectional.

After steps S101 and S102 have been executed, irrespective of order, the method continues with the phone 104 sending the data collected from the tag 108 (e.g., the tag's UID), the data collected from the user 116, and/or metadata information (e.g., timestamp information describing when the transmission or data collection occurred, geolocation information, GPS information, network information, and/or any other information describing the circumstances surrounding the data collection event) to the trusted authority 112 (step S103). Based on the information received from the phone 104 (e.g., tag UID, user-entered information, metadata information, etc.), the trusted authority 112 invokes the signature creation module 124 to generate a unique validation signature and possibly encrypt the unique validation signature. Details of the validation signature or the encryption of the validation signature may be stored in the validation database 128 to allow the trusted authority 112 to validate the tag 108 at a later time.

In some embodiments, the validation signature may be computed by providing some or all of the inputs received from the phone into a cryptographic hash function (e.g., MD5, SHA-1, SHA-2, SHA-3, SHA-256, SHA-512, etc.), an XOR function, or the like. The resulting value obtained by processing the inputs received from the phone may be referred to as a validation signature. The trusted authority 112 may then further secure or encrypt the validation signature with one or more encryption keys to create an encrypted validation signature. As can be appreciated, the encrypted validation signature may be generated using a private key from a symmetrical or asymmetrical key pair. More specifically, the validation signature can be signed with a private key from a symmetric private-private key pair, a private key from an asymmetric private-private key pair, or a private key from a private-public key pair. It may be desirable to use a private-public key pair if analysis of the validation signature will ultimately be performed by an entity other than the trusted authority that is creating the validation signature. If, however, circumstances dictate that analysis of the validation signature should be performed by the entity that created the validation signature, then it may be desirable to use a private-private key pair.

The trusted authority 112 then transmits the validation signature, the encrypted validation signature, any public validation keys, the user-entered information, the metadata, and/or other information used to create the validation signature back to the phone 104 (step S104). Some or all of the payload may be transmitted to the phone 104 in one or more electronic messages or as attachment(s) to one or more electronic messages transmitted over a communication network.

The phone 104, still operating in the Reader/Writer Mode, then writes some or all of the data received from the trusted authority 112 to the tag 108 (step S105). In particular, it may not be necessary to re-write the tag data back to the tag 108, since it already exists there, but it may be desirable to write the user-entered information, the validation signature, the encrypted validation signature, and/or any metadata used to create the validation signature onto the tag 108. Some or all of this data payload may be written and stored in memory of the tag 108 as one or more NDEF records. The validation signature may be stored in a secure (e.g., encrypted, write-protected, etc.) area of memory or an unsecure area of memory. The phone 104 may also display information to the user 116 indicating that the payload (e.g., validation signature, encrypted validation signature, user-entered information, metadata, etc.) has been successfully written to the tag 108.

Figure 2:
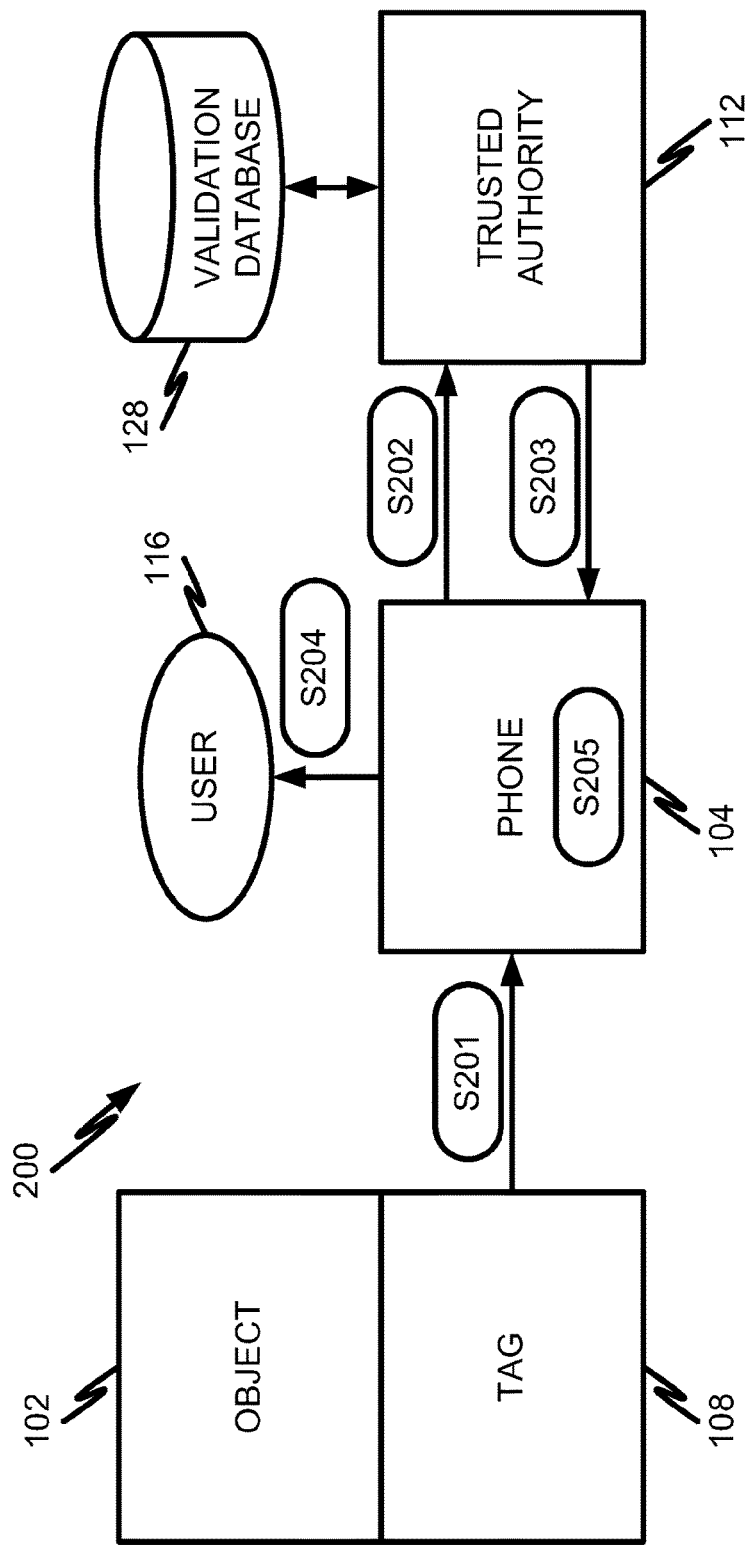
FIG. 2 is a block diagram depicting a communication system and method for reading data from a tag in accordance with embodiments of the present disclosure.

With reference now to FIG. 2, a system 200 and method of reading data from a tag 108 and validating such information at the trusted authority 112 will be described in accordance with at least some embodiments of the present disclosure. The method begins when tag data is read from the tag 108 by the phone 104 (step S201). It should be understood that the phone 104 which is reading the data from the tag 108 does not necessarily have to be the same device that wrote the validation signature, user-entered information, etc. to the tag 108, and in most cases it will not be the same device. In some embodiments, the phone 104 reads a validation signature from the tag 108, some or all of the user-entered information, as well as a UID of the tag 108.

The phone 104 then transmits the read data (e.g., the validation signature, the user-information, and/or the UID of the tag 108) to the trusted authority 112 for validation (step S202). It should also be appreciated that the entity or device (e.g., server) that prepared and provided the validation signature for the tag 108 does not necessarily have to be the same entity or device that validates the validation signature stored on the tag 108. In other words, the phone 104 may communicate with a different server during validation than was used during the creation of the signature. In some embodiments, the information provided by the tag 108 may identify which server(s) (e.g., by URL, URI, port number, etc.) the phone 104 should transmit the information to in step S202.

The trusted authority 112 then invokes the signature validation module 120 to analyze the information received from the phone 104. In some embodiments, the trusted authority 112 may compare the validation signature with a validation signature stored in the validation database 128 for the tag 108 that transmitted the validation signature. In other embodiments, the trusted authority 112 may receive the tag data, the user-entered data (stored on the tag 108), the metadata (stored on the tag 108) and re-calculate a second validation signature. The second validation signature may be compared with the validation signature that was originally written to the tag 108. Moreover, the comparison may be performed on encrypted versions of the validation signatures. In other embodiments, if the trusted authority 112 only receives an encrypted validation signature from the tag 108, then the encrypted validation signature may first be decrypted before it is compared with another validation signature. It may also be possible to extract the data from the validation signature (e.g., original tag data, user-entered information, metadata, etc.) and compare that data with similar data stored in the validation database 128.

The method continues with the trusted authority 112 providing results of the validation analysis back to the phone (step S203). The results provided back to the phone 104 may include an acknowledgement or denial of validation. If the validation was denied, the trusted authority 112 may not send any information back to the phone 104 or a null message may be transmitted back to the phone 104.

Upon receiving the message from the trusted authority 112 (or upon failure to receive a message within a predetermined amount of time of sending the data in step S202) the phone 104 may provide a visual indication of the NFC notary's 112 validation analysis to the user 116 (step S204). In some embodiments, the phone 104 may provide a visual or audible indication that the validation of the tag's 108 validation signature was successful and the tag 108 is valid. This may also indicate that the object 102 with which the tag 108 is associated is also authentic (e.g., assuming that there has been no tampering with the association between the tag 108 and object 102). Any type of visual or audible indication can be provided in step S204. As an example, the phone 104 may present a trademark or logo associated with the tag 108 and/or object 102. Additionally, or alternatively, the phone 104 may perform one or more predetermined actions (step S205) in response to receiving the results of the signature validation. As an example, the phone 104 may automatically initiate a call to a predetermined number, generate and/or send a message to a predetermined recipient or address, launch a web browser to a predetermined webpage, display a predetermined image, prompt the user 116 for additional information, or combinations thereof.

Figure 3:
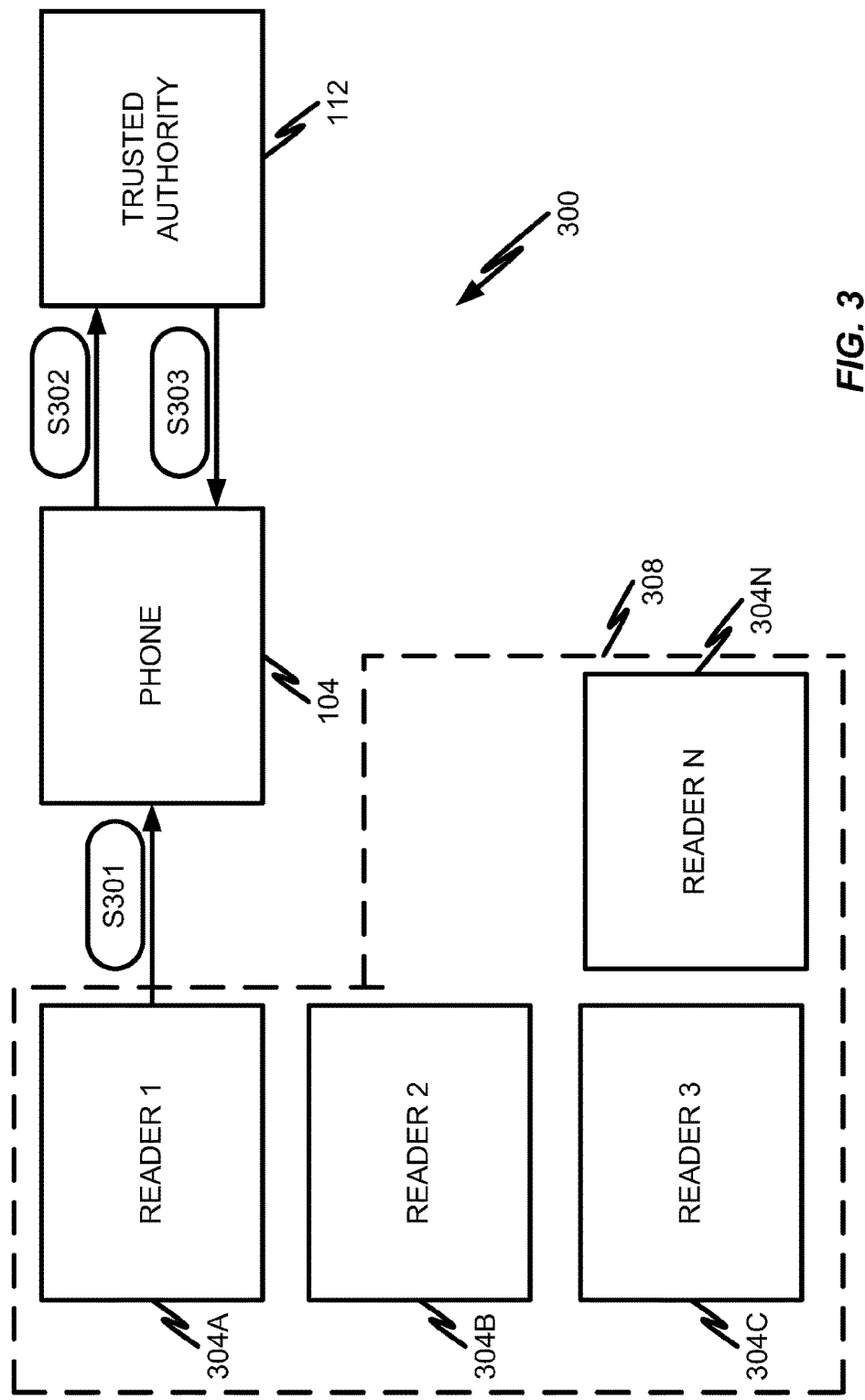
FIG. 3 is a block diagram depicting a communication system and method for obtaining keys based on access control validation in accordance with embodiments of the present disclosure.

With reference now to FIG. 3, a method of distributing access keys (e.g., access credentials) will be described in connection with communication system 300 and in accordance with at least some embodiments of the present disclosure. The method begins when a phone 104 is used to gain physical and/or logical access to an asset of a premises 308 that is protected by a first reader 304A (step S301). In some embodiments, the first reader 304A may be connected to an access control system backend (e.g., a control panel or some other access validation equipment). In some embodiments, the first reader 304A may correspond to a non-networked or offline reader that is not connected to a system backend or control panel. Examples of such readers and methods of gaining access to assets protected thereby are described in U.S. Pat. No. 8,074,271 to Davis et al. entitled "Method and Apparatus for Making a Decision on a Card", the entire contents of which are hereby incorporated herein by reference. In some embodiments, the phone 104 is operating in the Card Emulation Mode and the first reader 304A may perform the analysis of the access credential provided by the phone 104. In some embodiments, the phone 104 may operate in the Reader/Writer Mode and receive information from the first reader 304A to make an access control decision for itself. Regardless of whether the first reader 304A or the phone 104 makes the access control decision, if access is granted, the first reader 304A may perform one or more actions to allow a holder or user of the phone 104 to gain access to the asset(s) protected by the first reader 304A.

Furthermore, upon successful access validation, the phone 104 may be configured to inform the trusted authority 112 that it has successfully gained access to an asset of the premises 308 at the first reader 304A (step S302). As with the system 200, it should be appreciated that the phone 104 used in this method does not necessarily have to correspond to the phone 104 that wrote the validation signature to a tag 108 or a phone 108 that was used to validate a tag 108. Likewise, the trusted authority 112 that receives the information from the phone 104 in step S302 does not necessarily have to be the same entity or device that provided a signed validation signature for writing to a tag 108 or that validated a tag 108.

Upon receiving the indication of successful access validation, the trusted authority 112 may obtain and return application tag keys that are useable within the premises 308 (step S303). These additional tag keys can then be written to the other readers 304B-N within the premises 308. Alternatively or additionally, the additional tag keys can be used by the phone 104 to gain access to assets protected by the other readers 304B-N in the premises 308.

The premises 308 may correspond to a building, multiple buildings, rooms within a building, rooms in a hotel, a computer network, or some other collection of assets that are distributed or co-located with one another and under the ownership/protection of a single entity (e.g., a company, a person, a school, a hotel, etc.). The other readers 304B-N may or may not correspond to non-networked readers. Each of the readers 304A-N may be configured to protect physical and/or logical assets.

Figure 4:
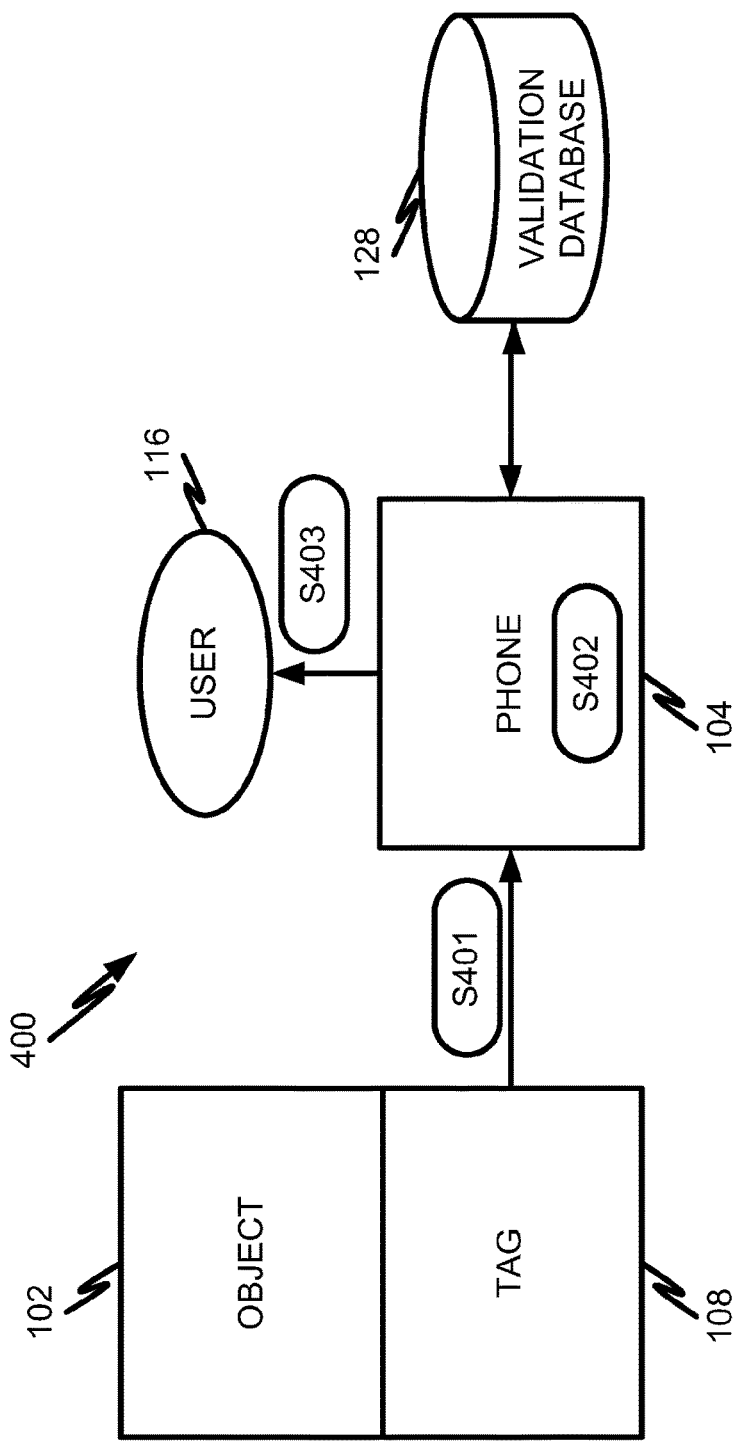
FIG. 4 is a block diagram depicting a communication system and method for validating tag authenticity in accordance with embodiments of the present disclosure.

With reference now to FIG. 4, an alternative method of validating tag 108 authenticity will be described in connection with communication system 400 and in accordance with at least some embodiments of the present disclosure. In this validation method, the phone 104 is configured to perform some or all of the functions of the trusted authority 112 during validation. Again, the phone 104 does not have to be the same phone 104 that wrote the validation signature to the tag 108. Moreover, the validation signature that is validated by the phone 104 may have been written to the tag 108 with or without the help of a trusted authority 112.

The method begins when the phone 104 reads data from the tag 108 (step S401). This step may be similar or identical to step S201. Thereafter, the phone 104 may invoke an internally-maintained version of the signature validation module 120 (step S402). This step may be similar or identical to the validation steps performed by the trusted authority 112 except that the phone 104 refers to the validation database 128, which may be internal to the phone 104 or external to the phone 104, and performs the analysis of the validation signature and/or tag UID received from the tag 108. In this particular embodiment, it may be desirable for the phone 104 to use a public key that corresponds to a private key that was used to generate the encrypted validation signature, if the validation signature was encrypted with such a private key. This enables multiple different phones 104 to validate the same validation signature on the tag 108 without compromising the private key that was used to encrypt the validation signature.

Based on the results of the validation analysis, the phone 104 may perform one or more predetermined actions and/or provide indications of the validation results to the user 116 (step S403). This step may be similar or identical to step S204 and/or step S205.

Figure 5:
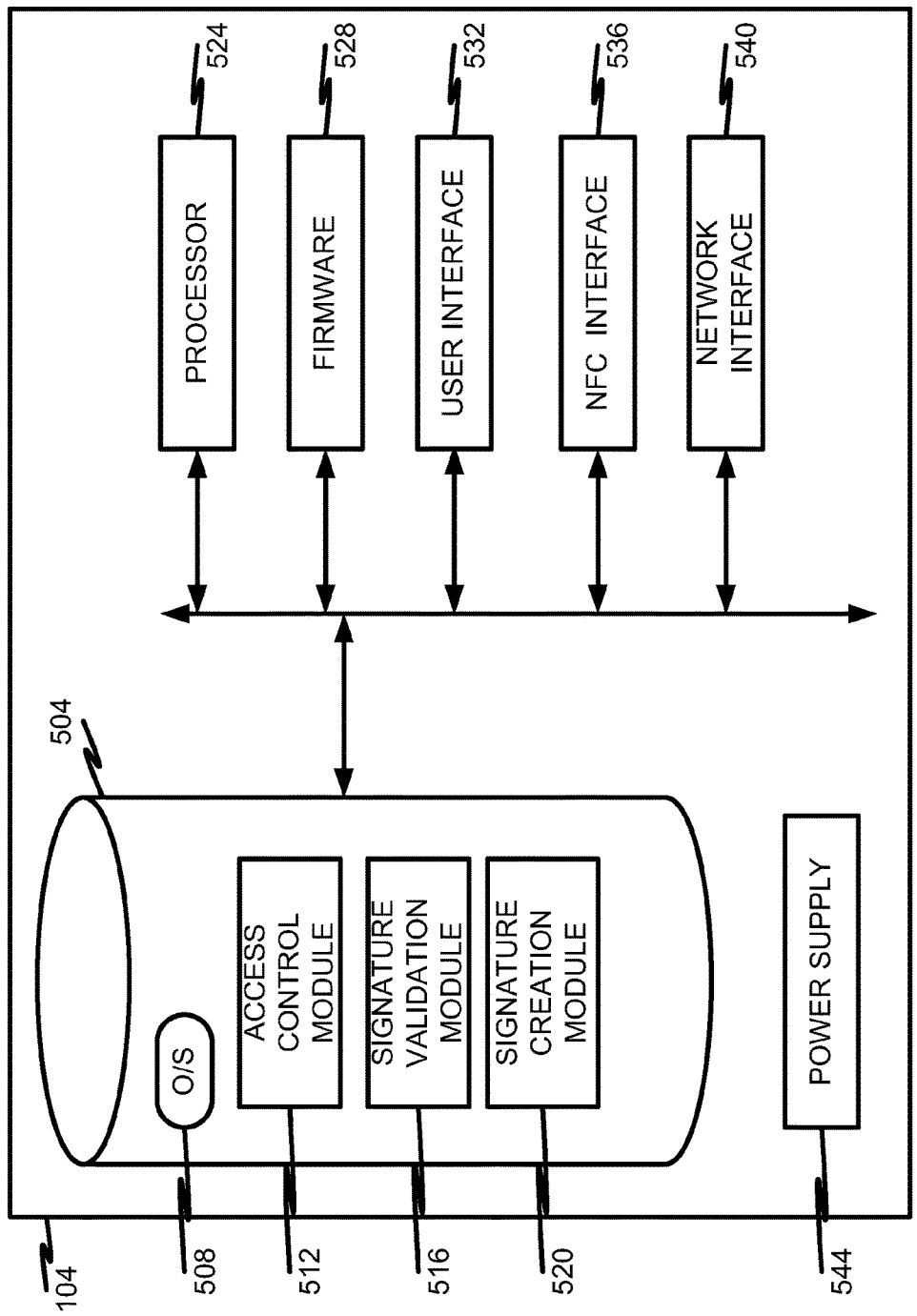
FIG. 5 is a block diagram depicting details of an NFC-enabled phone in accordance with embodiments of the present disclosure.

With reference now to FIG. 5, additional details of an illustrative phone 104, similar communication device, or collection of communication devices will be described in accordance with at least some embodiments of the present disclosure. The phone 104 may comprise memory 504, firmware 528, one or more processors 524, a user interface 532, an NFC interface 536, a network interface 540, and a power supply 544.

The memory 504 generally comprises software routines facilitating, in operation, pre-determined functionality of the phone 104. The memory 504 may be implemented using various types of electronic memory generally including at least one array of non-volatile memory cells (e.g., PROM, EPROM, EEPROM, etc.) and/or at least one array of DRAM cells. Some portions of the memory 504 may be pre-programmed and write-protected thereafter, whereas other portions of the memory 504 may selectively be modified or erased. The memory 504 can either be a temporary data storage location or a permanent data storage location. Accordingly, the memory 504 may alternatively, or additionally, include long-term memory devices, such as RAM, ROM, a magnetic storage device, a solid-state storage device, an optical storage device, a logic circuit, or any combination of such devices. It should further be appreciated that the programs and data that may be maintained in the memory 504 can comprise software, firmware or hardware logic, depending on the particular implementation of memory 504.

In some embodiments, instructions contained in memory 504 can be implemented or executed by the processor 524. Alternatively, or in addition, various capabilities of the phone 104 may be implemented in firmware 528.

The processor 524 may include any general-purpose programmable processor, digital signal processor (DSP) or controller for executing application programming. Alternatively, the processor 524 may comprise a specially configured application specific integrated circuit (ASIC). The processor 524 generally functions to run programming code implementing various functions performed by the phone 104.

Some of the applications or sets of instructions that may be stored in memory 504 and/or firmware 528 include an Operating System (O/S) 508, an access control module 512, a signature validation module 516, and/or a notary module 520. The O/S 508 may be a high-level application that executes the primary operational functions of the phone 104 such as power-up functions, tamper detection functions, communication functions, and any other function that supports the basic operation of the phone 104.

The access control module 512 may contain instructions that enable the phone 104 to perform access control operations (e.g., determine access permissions for itself) and/or instructions for providing access credentials from the phone 104 to a reader (e.g., in Card Emulation Mode). Accordingly, in some embodiments the access control module 512 may contain instructions that cause the phone 104 to analyze reader/door information, timestamp information, etc. in connection with making an access control decision. Alternatively, or additionally, the access control module 512 may comprise one or more access control credentials that can be transmitted to a reader for verification thereby.

It should be appreciated that some or all of the access control module 512 may be provided on a control panel or host computer that is located remote from the phone 104 and a reader 304A-N. The access control module 512 is depicted as being included in the phone 104 only to simplify the description and should not be construed as limiting embodiments of the invention.

The signature validation module 516 and notary module 520 may be similar or identical to the signature validation modules and notary module discussed in connection with the trusted authority 112. The only difference is that one or both modules 516, 520 may be executed locally by the phone 104 and the need for an external trusted service may not be required in all circumstances.

The user interface 532 may comprise a user input and/or user output. Examples of user outputs that may be included in the user interface 532 include one or more lights, speakers, LEDs, an array of LEDs, plasma displays, and so on. Examples of suitable user inputs that may be used for the user interface 532 include one or more of a button, microphone, keyboard, PIN pad, keypad, group of buttons, camera, etc. The user interface 532 may also comprise a combination user input and user output, such as a touch-sensitive display (e.g., capacitive sense display, optical finger navigation device, etc.).

The NFC interface 536 may provide the hardware and drivers that enable the phone 104 to exchange data with the tag 108 and any other NFC-enabled device (e.g., another NFC-enabled phone when operating in a Peer-to-Peer mode). The NFC interface 536 may also comprise a generic credential interface (e.g., non-NFC-compatible portion) that utilizes contact-based and/or contactless communications other than NFC. In some embodiments, the NFC interface 536 may facilitate the reading of NFC tags 108 as well as other non-NFC-enabled devices (e.g., magstripe cards, Wiegand cards, smart cards, proximity cards or prox cards, QR codes, barcodes, optical cards, etc.). A viable alternative to the NFC interface 536 is a Bluetooth interface.

The network interface 540 may correspond to a device or collection of devices that enable the phone 104 to connect with and exchange messages over a communication network (e.g., cellular network, TCP/IP network, SNMP network, etc.). Accordingly, the network interface 540 may comprise multiple different devices or communication ports. Examples of the network interface 540 include, without limitation, a network interface card, a modem, a USB port, a parallel port, a serial port, a Small Computer Systems Interface (SCSI) port, an RS-232 port, a Wiegand port, an Ethernet port, an infrared port, an RF interface, a cellular communication interface, an 802.11N network interface, and/or other wired or wireless communication network interfaces.

The power supply 544 may comprise an internal source of power (e.g., a battery). Alternatively, or in addition, the power supply 544 may comprise a specially-adapted port along with a power conditioner configured to convert AC power from an external outlet into DC power that is useable by the phone 104. The power supply 544 may further comprise the ability to charge the internal source of power with power from an external source.

Figure 6:
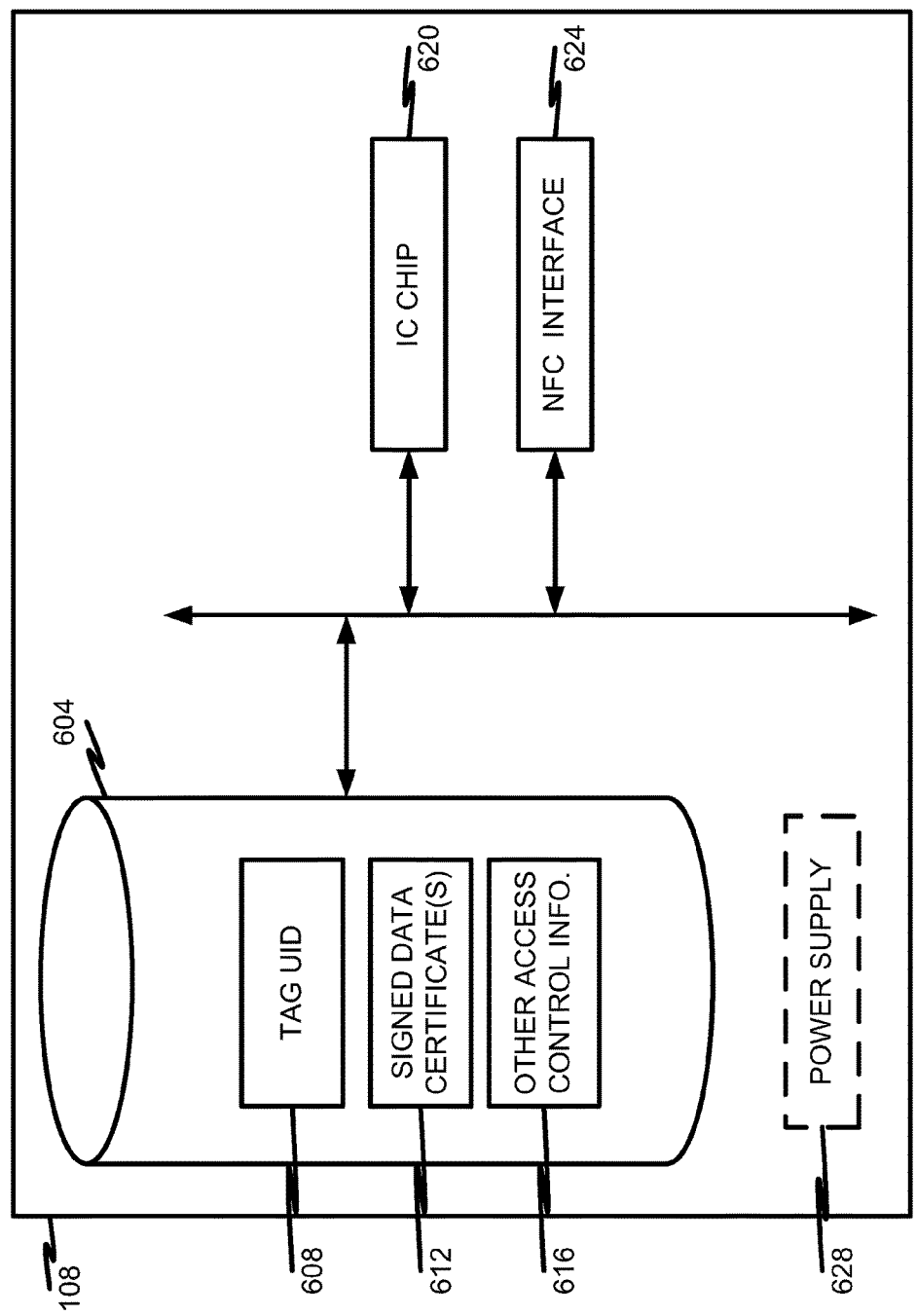
FIG. 6 is a block diagram depicting details of a tag in accordance with embodiments of the present disclosure.

With reference now to FIG. 6, additional details of a tag 108 will be described in accordance with at least some embodiments of the present disclosure. The tag 108, in some embodiments, may comprise memory 604, an IC chip 620, an NFC interface 624, and an optional power supply 628. In some embodiments, the memory 604 may be incorporated into the IC chip 620. Whether integrated into the IC chip 620 or not, the memory 604 may be configured to store a tag UID 608, one or more validation signatures 612, an other access control information. As discussed above, the signed validation signature(s) 612 may be written to the tag 108 during a tag notarization process via a signature creation module 124, 520. The tag UID 608 may be written to the tag 108 during manufacture of the tag 108 or during its provisioning/distribution. The other types of access control information 616 that may be stored in the memory 604 include, without limitation, site codes, manufacturer codes, encryption keys, authentication algorithms, access control verification algorithms, and the like.

The IC chip 620 may correspond to any type of integrated circuit, processor, microprocessor, and/or memory device. As noted above, in some embodiments, the memory 604 is incorporated into the IC chip 620.

The NFC interface 624 may correspond to an antenna, multiple antennas, and/or drivers thereof that enable the tag 108 to communicate with the NFC interface 540 of the phone 104. In particular, the NFC interface 624 may help create an air core coupler with the NFC interface 540.

It should be appreciated that the tag 108 may correspond to an NFC Forum Tag or a non-NFC Forum tag. In particular, the tag 108 may correspond to any type of NFC tag that is capable of storing NDEF formatted data and operates with ISO 14443 or ISO 15693 infrastructure and NFC devices as defined by the NFC Forum. An NFC Forum Tag is compatible to one of four NFC Forum Tag platforms capable of storing NDEF formatted data. ICODE or Mifare™ Classics can be NFC tag, but not NFC Forum Tags. Mifare UltraLight™, ULC, NTAG, DESFire, SmartMX, Topax, and FeliCa can be NFC Forum Tags. As noted above, the tags 108 can be provided in various shapes and sizes.

Figure 7:
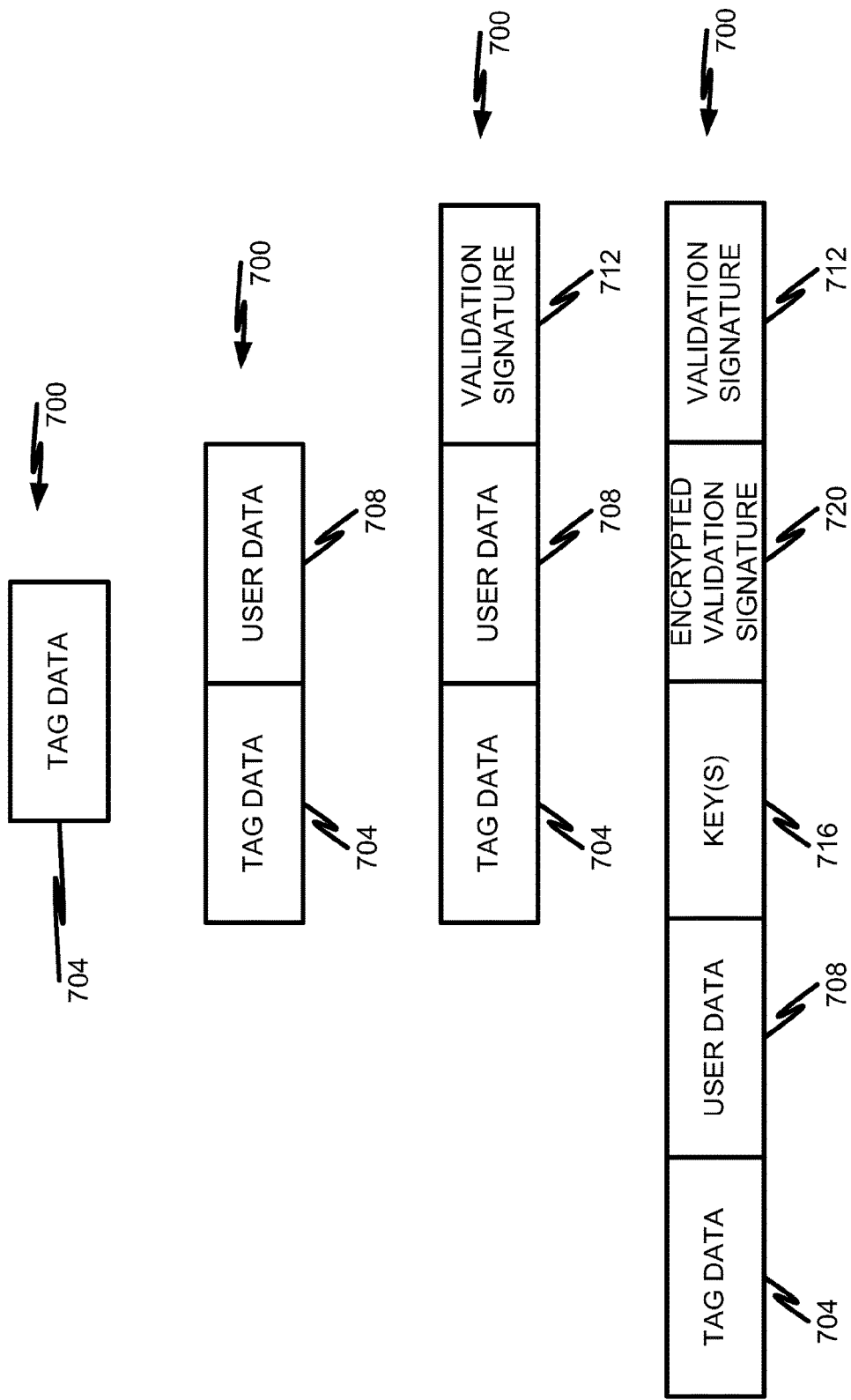
FIG. 7 is a flow diagram depicting details of building a data structure for a trusted tag in accordance with embodiments of the present disclosure.

With reference now to FIG. 7, various configurations of a data structure 700 that can be created for and stored on a tag 108 will be described in accordance with at least some embodiments of the present disclosure. Specifically, the data structure 700 may initially start out as tag data 704. As noted above, tag data 704 may include any type of data that is stored on the tag 108, describes the tag 108, describes a manufacturer of the tag 108, describes a user of the tag 108, etc.

At some point, the data structure 700 may be updated to include user data 708. The user data 708 may be added to the data structure 700 by the phone 104 or by some other device that reads the tag 108. In some embodiments, the user data 708 may store any type of user-entered information described above, such as URLs, names, descriptions of service, descriptions of conditions of the object 102, PINs, passwords, etc. Depending upon the type of information stored in the user data 708, the data may be encrypted or password protected to protect the data. Although not depicted, the use data 708 may also include metadata describing the user-entered information or any other conditions surrounding the entry of the user data.

The data structure 700 may be further amended to include a validation signature 712. As discussed above, the validation signature 712 may be generated based on the information contained in the tag data 704 and/or user data 708. The validation signature 712 may correspond to a value generated with a cryptographic hash function, an XOR function, or a similar signature-generating algorithm. Thus, the validation signature 712 can be used to validate the user data 708 that will eventually be written onto the tag 108, especially if the validation signature 712 is also written to the tag.

In some embodiments, the validation signature 712 may be encrypted with one or more encryption keys 716 to produce an encrypted validation signature 720. As can be appreciated, it may be desirable to only provide the encrypted validation signature 720 to the phone 104 for writing to the tag 108. In other embodiments, it may be desirable to write the validation signature 712 to the tag 108. Depending upon the type of encryption keys 716 used, it may be desirable to maintain the encryption keys in a secure location (e.g., validation database 128, trusted authority 112, etc.). In some embodiments, it may be desirable to distribute at least a public encryption key 716 to facilitate local signature validation. In some embodiments, the final data structure 700 may be stored in the validation database 128 whereas only parts of the final data structure 700 may be provided back to the phone 104 for writing to the tag 108 or for local storage at the phone 104.

As noted above, many different use cases can be envisioned wherein trusted tag(s) can be employed. A few non-limiting examples will be discussed in turn.

Brand Protection/Authenticity Verification

An inherent advantage to using trusted tag(s) and specifically NFC technologies for brand protection is that the provider of the product or service (e.g., the Brand) can mark their products or services with trusted tags. Private keys can be distributed to any entity that wants to verify whether a particular product or service is a genuine product or service provided by the Brand. Thus, local validation as described in connection with FIG. 4 may be used to read data from a tag 108 (e.g., tag data, user-entered data, metadata, and a validation signature (encrypted or unencrypted). The validation steps may be performed to determine if the validation signature on the tag 108 was written to the tag either by the Brand or at the direction of the Brand. If the validation signature cannot be validated, then it may be surmised that the product or service in question is counterfeit or fake.

An inherent advantage to using trusted tags is that the Brand can learn more about their end customers. Specifically, NFC technologies would enable the Brand to know more about the consumer's purchasing habits to propose additional services (e.g., warranty extensions, special offers, events, etc.). The Brand can also learn more about the sale event in near-real-time thereby allowing them to better manage the global and local supply chain, better control the grey market, and better detect a stolen product and revoke its warranty. In essence, the Brand will be allowed to limit the cost of counterfeit products being sent back to repair in exchange for a genuine one.

Notarization

Notarization services are often required for substantial financial transaction and legal transactions. Current notarization requires a notary to sign or attest to a signature or action and then provide a notary seal on the piece of paper that was signed by the notary. Embodiments of the present disclosure enable an electronic notary that is far more sophisticated and secure that traditional notary services.

In the common fashion, a notary may witness a signature or action and place a tag 108 on an object 102 being notarized. Often times the object 102 will correspond to a piece of paper or a document (e.g., a will, trust, Power of Attorney, cashier's check, piece of commercial paper, etc.), but embodiments of the present disclosure are not so limited. Specifically, the tag 108 can be associated with any type of object 102 by placing the tag 108 on or near the object 102 being notarized. In the example of a piece of paper or a document, the notary may place a sticker-type tag 108 on the piece of paper or document and scan the tag 108 with their phone 104. Alternatively, the paper or document may have the tag 108 embedded therein and the tag 108 can be simply read with the phone 104.

The notary may then enter their user name, PIN, password, picture, etc. to verify their identity and the fact that they are empowered to be a notary. The phone 104 may transmit the information obtained from the tag, the information entered by the notary, and any metadata describing the circumstances around the notary event (e.g., time of day, day, month, year, etc.) to the trusted authority 112.

Upon receiving the information from the tag 108, the trusted authority 112 may generate one or more validation signatures, possibly encrypt the signature(s), and transmit the validation signature(s) back to the phone 104. The phone 104 may then write the validation signature(s) along with some or all of the information entered by the notary into their phone 104 back to the tag 108. This data may be stored by the tag 108 such that it can be subsequently read by other devices to ensure that the notary was valid.

Dual Notarization

Similar to the notarization example described above, dual notarization may be employed where two different users notarize the tag 108. For example, many legal documents and the like require two witness signatures (e.g., notarizations) rather than a single notarization. In a dual notarization example, the first notary may scan the tag 108 and enter their user name, PIN, password, picture, etc. to verify their identity and the fact that they are empowered to be a notary. Then the second notary may scan the tag 108 and enter their user name, PIN, password, picture, etc. to verify their identity and the fact that they are also empowered to be a notary.

In one embodiment, the first and second notary may both use the same phone 104 to scan the tag 108. In this scenario, the phone 104 may store the first notary's information until the second notary enters their information. Once information for both notaries have been received at the phone 104, then the phone may send along the captured information to the trusted authority 112 where it is processed similarly to the way in which the single notary information was processed. If a single phone 104 is being used by both notaries, then it may be possible to only require the phone 104 to read the tag 108 once rather than twice. Likewise, a single transaction between the phone 104 and tag 108 may be executed to write the validation signature onto the tag 108 (e.g., the validation signature may contain information for both notaries).

In another embodiment, the first and second notary may use different phones 104 to read the tag 108. Each notary may enter their user name, PIN, password, picture, etc. to verify their identity and the fact that they are empowered to be a notary. Each notary's phone 104 may then independently send the captured information to the trusted authority 112. The trusted authority 112 may then generate two separate validation signatures and send each signature back to the appropriate phone 104. Thereafter, each phone 104 may write its validation signature onto the tag 108. Alternatively, the trusted authority 112 may capture the information from both phones 104 and combine such data to generate a single validation signature. That single validation signature may be sent to one of the two phones 104 for writing back to the tag 108.

Chain-of-Custody

Another example scenario in which a trusted tag can be utilized is in chain-of-custody. Such scenarios may occur for pieces of evidence, where chain-of-custody is highly important to show. Other scenarios include car ownership, fine art ownership, bailment, etc. Specifically, if chain-of-custody is ever required to be proven or shown for an object 102, a tag 108 may be associated with that object 102. Whenever custody of the object 102 is to change from one entity to another, the trusted tag 108 may have a new validation signature written thereto describing the transfer of custody. The transferring entity, the receiving entity, or both may read the tag 108 with a phone 104 and then enter into their phone 104 any necessary information to describe the situation surrounding the transfer of custody (e.g., names of entities, description of object 102, description of condition of object 102, etc.). This user-entered information along with the tag data and/or metadata can be used to generate one or more validation signatures. These validation signatures can then be written to the tag 108 along with some or all of the user-entered information describing the transfer of the object 102.

Signatures (for Creative or Copyrighted Works)

Some objects 102 by their very nature require a signature that will need to be validated at some later time. Examples of such objects include copyrighted works (e.g., paintings, sculptures, photos, etc.). These objects 102 may want to be controlled by the copyright owner as well as validated by potential purchasers. Using the non-limiting example of an original painting, once the artist has completed the painting, the artist may affix a tag 108 to the painting or to something near the painting (e.g., a frame, backing, etc.). Then the artist may implement the methods discussed herein (e.g., the signature process described in connection with FIG. 1) to write their signature to the tag 108 possibly along with other metadata (e.g., a name for the painting, when it was signed, where it was created, etc.). This additional metadata may be written to the tag 108 along with the validation signature or it may simply be stored in the validation database 128 for later reference.

If the creative work corresponds to one copy of a limited number of copies (e.g., copy number 35 of 200 copies of a photo distributed by the photographer), then additional metadata that may be written to the tag 108 (and possibly used to generate the validation signature) may include the 35 of 200 information along with information surrounding when the copy was created, who created the copy, etc.

Secure Logging

Some objects 102 require a specific level of service and the service for such objects 102 is required to be tracked meticulously—sometimes to ensure that warranties are not voided, sometimes to ensure that public safety is maintained, etc. Examples of such objects 102 include high-value objects (e.g., cars, jewelry, clothing, electronics, etc.) as well as other objects like planes and plane parts. When service is performed on such objects, it is current practice to maintain a service log for that object 102. However, the service log is often maintained separate from the object (e.g., on a separate piece of paper). Embodiments of the present disclosure can be employed to maintain the service log on a tag 108 that has been associated with the object 102. For example, if a high-value object is being serviced, then the service technician can write some data regarding the service onto the tag 108 and that data can also be used to generate the validation signature that is written to the tag 108. Specifically, the service technician may enter information describing the service that was performed and the condition of the object 102. It may also be desirable to use geolocation metadata to (1) generate the validation signature and (2) prove that the service occurred at a qualified service location.

Printed Warranty/Document Validation

Much like create and copyrighted works, some documents require validation. Examples of such documents include certified warranties, title documents, legal agreements, etc. When documents of such high value require validation, it may be possible to produce the document with an intergated tag 108 (e.g., the tag 108 may be integrated within a sheet of paper or multiple sheets of paper). Prior to distributing the document, the mechanisms of FIG. 1 may be employed to write a validation signature and other user-entered data onto the tag 108.

Certified Appraisal

Yet another example where a trusted tag 108 can be employed is with certified appraisals. This scenario is similar to the notary or document validation example except that the appraiser may provide user-entered information in the form of the appraisal value, when the appraisal occurred, a description of the object 102 during the appraisal, etc. This information can be used to generate the validation signature as well as be written onto the tag 108.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving data from a phone, the received data including user-entered data and at least one of tag data of a tag and metadata, wherein the user-entered data comprises at least one of a user-entered alphanumeric string, a still image, a motion video, and an audio segment;
   causing the user-entered data to be stored into a memory of the tag, wherein the user-entered data is stored in an unencrypted format;
   based on the received data, generating a validation signature for the tag;
   and causing the validation signature to be written into the memory of the tag;
   wherein the validation signature is written to the memory of the tag such that the validation signature for the tag is later usable to validate the user-entered data and enables a predetermined action to be performed with the at least one of tag data and the metadata.

2. The method of claim 1, wherein the received data includes the user-entered data as well as both of the tag data and the metadata and wherein the validation signature is written to an unsecure area of the memory.

3. The method of claim 1, wherein the received data includes the tag data and wherein the tag data comprises at least one of a tag Unique Identifier (UID), a site code, and a manufacturer code.

4. The method of claim 3, wherein the tag data is obtained from the tag via an NFC-enabled phone.

5. The method of claim 4, wherein the user-entered data is received the phone and wherein the phone writes the validation signature and the user-entered data into the memory of the tag as an NFC Data Encoding Format (NDEF) record using an NFC protocol.

6. The method of claim 1, wherein the received data includes the metadata and wherein the metadata corresponds to a timestamp related to when the validation signature is generated.

7. The method of claim 1, wherein the received data includes a tag Unique Identifier (UID) that is obtained from the tag by a phone, wherein the received data also includes the user-entered data that is received from a user at the phone, wherein the received data also includes the metadata that is generated in response to the phone obtaining the tag UID, and wherein the phone causes the validation signature to the written into the memory of the tag along with the user-entered data.

8. The method of claim 7, wherein a trusted authority generates the validation signature and transmits the validation signature to the phone for writing to the tag.

9. The method of claim 1, wherein the tag comprises an internal power source.

10. The method of claim 1, wherein the tag is an NFC tag.

11. A method, comprising:
    at a first time:
       receiving data from a phone, the received data including user-entered data that comprises at least one of a user-entered alphanumeric string, a still image, a motion video, and an audio segment, wherein the received data further includes at least one of: (i) tag data and (ii) metadata;

based on the received data, generating a validation signature for the tag;

causing the user-entered data to be stored into a memory of the tag, wherein the user-entered data is stored the memory of the tag in an unencrypted format;

causing the validation signature to be written into the memory of the tag; and at a second time, after the first time:

receiving a new validation signature and new tag data from memory of a new tag;

performing a validation analysis of the new tag by comparing the received new validation signature and the new tag data with known valid tag data and a corresponding validation signature; and providing results of the validation analysis to at least one interested party.

12. The method of claim 11, wherein the at least one interested party corresponds to a user of a phone, wherein the phone was used to retrieve the validation signature and the tag data from the memory of the tag, and wherein the results of the validation analysis are provided to the user of the phone by at least one of audibly and visibly presenting an output via the phone.

13. The method of claim 12, further comprising:

based on the results of the validation analysis, causing the phone to perform at least one predetermined action.

14. The method of claim 13, wherein the at least one predetermined action comprises at least one of the following: causing the phone to initiate a call to a predetermined number, causing the phone to generate a message to a predetermined number, causing the phone to generate a message to a predetermined email address, causing the phone to automatically connect with a web server associated with a predetermined Universal Resource Locator (URL), and causing the phone to display at least one image via its user interface.

15. The method of claim 12, wherein the phone performs the validation analysis.

16. The method of claim 12, wherein a trusted authority that is separated from the phone by a communication network performs the validation analysis.

17. A communication system, comprising:

a tag having memory and an interface;

a trusted authority configured to receive data from a phone that has read the tag, the received data including user-entered data and at least one of tag data and metadata, wherein the phone is configured to write the user-entered data to the memory of the tag in an unencrypted format, wherein the trusted authority is further configured to generate a validation signature for the tag based on the received data and then cause the validation signature to be written into the memory of the tag;

further comprising a signature validation module configured to receive the validation signature from the tag and perform a validation analysis of the tag by comparing the received validation signature with one or more entries in a database of valid validation signatures.

18. The system of claim 17, wherein the phone is configured to read data from the tag via inductive coupling.

19. The system of claim 17, wherein the user-entered data comprises at least one of a still image, a motion video, and an audio segment.

* * * * *